United States Patent [19]
Bruno et al.

[11] Patent Number: 5,724,355
[45] Date of Patent: Mar. 3, 1998

[54] NETWORK ACCESS TO INTERNET AND STORED MULTIMEDIA SERVICES FROM A TERMINAL SUPPORTING THE H.320 PROTOCOL

[75] Inventors: Richard Frank Bruno, Morristown; Howard Paul Katseff, Manalapan; Robert Edward Markowitz, Glen Rock, all of N.J.; Carlos Alberto Perea, Bethlehem, Pa.; Bethany Scott Robinson, Colts Neck, N.J.; Sethuraman Suresh, Somerset, N.J.; Hugh L. Williams, Hillsborough, N.J.

[73] Assignee: AT&T Corp, Middletown, N.J.

[21] Appl. No.: 547,216

[22] Filed: Oct. 24, 1995

[51] Int. Cl.[6] .......................... H04L 12/66; G06F 13/00
[52] U.S. Cl. .......................... 370/401; 370/410; 370/466; 370/524; 395/200.02
[58] Field of Search .......................... 395/200.02, 200.1, 395/200.15, 200.2, 500, 800; 370/389, 395, 400, 401, 410, 420, 428, 465, 466, 467, 522, 524

[56] References Cited

U.S. PATENT DOCUMENTS

| | | | |
|---|---|---|---|
| 5,268,904 | 12/1993 | Umeda | 370/110.1 |
| 5,289,468 | 2/1994 | Yoshida | 370/85.13 |
| 5,406,557 | 4/1995 | Baudoin | 370/61 |
| 5,410,543 | 4/1995 | Seitz et al. | 370/463 |
| 5,425,028 | 6/1995 | Britton et al. | 370/94.1 |
| 5,444,703 | 8/1995 | Gagliardi et al. | 370/401 |
| 5,535,199 | 7/1996 | Amri et al. | 370/60 |
| 5,537,417 | 7/1996 | Sharma et al. | 370/94.1 |
| 5,550,984 | 8/1996 | Gelb | 395/200.17 |

OTHER PUBLICATIONS

R. M. Howe III, *AT&T Technology*, vol. 9, No. 4 Winter, pp. 18–21, "Vistium Products Give Another Point of View".

Primary Examiner—Alpus H. Hsu
Attorney, Agent, or Firm—Stephen M. Gurey

[57] ABSTRACT

Internet access is provided to a multimedia terminal (101, 102, 103, 104) supporting the H.320 protocol through a gateway server (125) that is connected to the Internet. The data stream of the H.320 bearer channel (ISDN phone line or switched 56 kbps facilities) is used for the exchange of data between the accessing terminal and the gateway server, which outputs and receives such data onto and from the Internet, respectively. The gateway server is implemented to function to directly exchange on the H.320 data stream information requests and responsive data in the TCP/IP format used for Internet transport. Alternatively, the gateway server is implemented to function as a proxy to which requests are passed from the terminal over the H.320 data stream, and where function calls are made and locally converted to TCP/IP format for transport onto the Internet. For responsive data received from the Internet, the proxy gateway server removes the TCP/IP formatting and transmits the resultant data back to the terminal over the H.320 data stream.

25 Claims, 3 Drawing Sheets

NETWORK ACCESS TO INTERNET AND STORED MULTIMEDIA SERVICES FROM A TERMINAL SUPPORTING THE H.320 PROTOCOL

TECHNICAL FIELD

This invention relates to a method and a system for accessing the Internet through a multimedia product that supports an H.320 protocol.

BACKGROUND OF THE INVENTION

Providing both multimedia (voice, video and data) communication products and services to customers is playing an increasingly more important role for telecommunications companies today. The power of multimedia communications is evident from the expansion in "videoconferencing", in which a user at a videoconferencing station can communicate "face-to-face" in real time with someone at a distant other videoconferencing station. The introduction of desktop videoconferencing equipment is making multimedia communications even more prevalent. Generally, multimedia communications uses equipment incorporated as part of a general purpose computer, or integrated systems specifically designed for the task. For example, the Vistium™ Personal Video (PV) product, available from AT&T, is a PC-based teleconferencing product that consists of circuit boards that plug into the expansion bus of a PC, which is used in conjunction with a video camera and applications software. A description of the Vistium product line can be found in "Vistium Products Give Another Point of View", by Robert M. Howe III, AT&T Technology, Volume 9, Number 4, Winter 1994, pp. 18–21.

The Vistium PV allows users to exchange audio, video, and data through their PCs with one another user by communicating over ISDN phone lines or over switched 56 kbps phone lines. An MS-Windows™-based teleconferencing application uses a Vistium-equipped PC to make a phone call to another Vistium-equipped PC or to another compatible device. The two users can then engage in a video phone call with the camera input of one user appearing in a window on the PC of the other user. In addition, data may be shared either by the exchange of files on the two PCs or through the use of shared applications running simultaneously on both PCs. As noted, one endpoint of the connection can be a Vistium-equipped PC or any other device which can exchange information over the ISDN or 56 kbps switched telephone lines using a protocol that is understood by both endpoints. The Vistium PV employs the H.320 protocol that has been adopted by the International Telecommunications Union (ITU) as an international standard for videoteleconferencing. The H.320 standard is a family of teleconferencing standards developed and maintained by the ITU which encompasses a variety of standards for audio compression, video compression, and telephone call set-up and control. The H.320 standard provides for the division of information into three distinct streams: video, audio, and data, where "data" herein is intended to mean digital information that is not meant to be displayed as real-time video or audio, and includes information to be displayed as text and data that is used to control applications or convey status to them. A PC operating in accordance with the H.320 standard is thus constrained to communicate only with one or more similar devices operating under the same standard.

As is well known, the Internet is a vast collection of computers communicating over a packet network, which allows information to be transferred between machines across the world. A PC typically accesses the Internet through a modem onto a user's POTS (plain old telephone service) phone line, or through a high-speed local area network (LAN). Connecting a PC to the LAN requires a card known as a LAN adapter that plugs into the computer's expansion bus. Information is exchanged over the Internet using a protocol known as TCP/IP (Transmission Control Protocol/Internet Protocol). In order to facilitate the easy use of the Internet, a programming interface has been developed providing high-level functions for performing functions such as sending and receiving data to and from a remote machine on the Internet. For PCs running Microsoft Windows™ this interface is called Windows Sockets or Winsock (see, e.g., M. Hall, Windows Sockets, Microsoft Corp., 1995). The Winsock interface allows a separation between high-level network applications and low-level hardware implementations. In the Windows programming environment, Winsock is implemented as a dynamic link library (DLL), which is a file that contains executable components that can be accessed by other applications. The DLL must be available to a computer's operating system (i.e., the operating system must be able to find the DLL on the hard disk) at the time that an application requests access; but the DLL is independent of the applications in the sense that the DLL can be changed or updated without needing to modify the applications.

A user of a Vistium or H.320 compatible-equipped PC which is designed to communicate over ISDN or switched 56 kbps lines, is precluded from accessing the Internet and the information services available thereon without additional hardware and software, in addition to requiring access to LAN or POTS lines necessary for Internet service. In order for a Vistium-equipped PC, to have the capability of accessing the Internet, therefore, it must be additionally equipped with either a LAN card for access to a LAN, or with a modem for access to a POTS telephone line. Both alternatives require the additional internal PC hardware and software plus the external structural infrastructure necessary to support the connection to either a LAN or a POTS line. As noted, this LAN or POTS connection is in addition to the connection to either the ISDN or 56 kbps lines necessary for H.320 multimedia communications. Any of the available prior art alternatives for supporting access to the Internet from a PC equipped to operate under the H.320 standard are therefore expensive from both a cost standpoint and from a space requirement standpoint. With respect to the latter, free space for such additional hardware accommodations is very limited on the newer small and compact PCs currently being offered in the computer marketplace.

An object of the present invention is to provide Internet access to those terminals supporting the H.320 protocol.

SUMMARY OF THE INVENTION

In accordance with the present invention, access to the Internet is provided to terminals supporting the H.320 protocol, over the data stream defined by H.320 standard, through a gateway server that is dialed by a user desiring access to the Internet. The gateway server, in turn, is connected over a LAN to the Internet. The gateway server provides the user of an H.320 terminal access to the Internet through either a direct TCP/IP or a proxy TCP/IP methodology.

In the direct TCP/IP methodology, a function call from a user's H.320 terminal's application program is made to a custom Winsock DLL to directly format this out-going request according to the TCP/IP protocols used for the exchange of information over the Internet. The TCP/IP formatted request is then transmitted over the H.320 data stream to the gateway server, which passes the data directly onto the Internet. Information retrieved over the Internet is received by the gateway server in TCP/IP format, and then passed, in that format, to the user's terminal over the H.320 data stream. The custom Winsock DLL within the terminal removes the TCP/IP formatting and passes the information to the application program, where it is available to the user.

In the proxy TCP/IP methodology, when the application program makes a function call to the Winsock DLL, rather than formatting the request to the TCP/IP format, a custom Winsock DLL passes the request to the gateway server over the H.320 data stream. The gateway server, in turn, receives the request and then makes a corresponding function call through its own standard Winsock DLL, which in turn is formatted to the TCP/IP format for output onto the Internet for delivery to an information service provider (ISP). Information retrieved from the ISP over the Internet is received by the gateway server wherein the standard Winsock DLL removes the TCP/IP formatting and transmits the information back to the user's H.320 terminal over the data stream. The user's custom Winsock DLL then collects this information and passes it to the application program, where it is available to the user.

DETAILED DESCRIPTION

Figure 1:
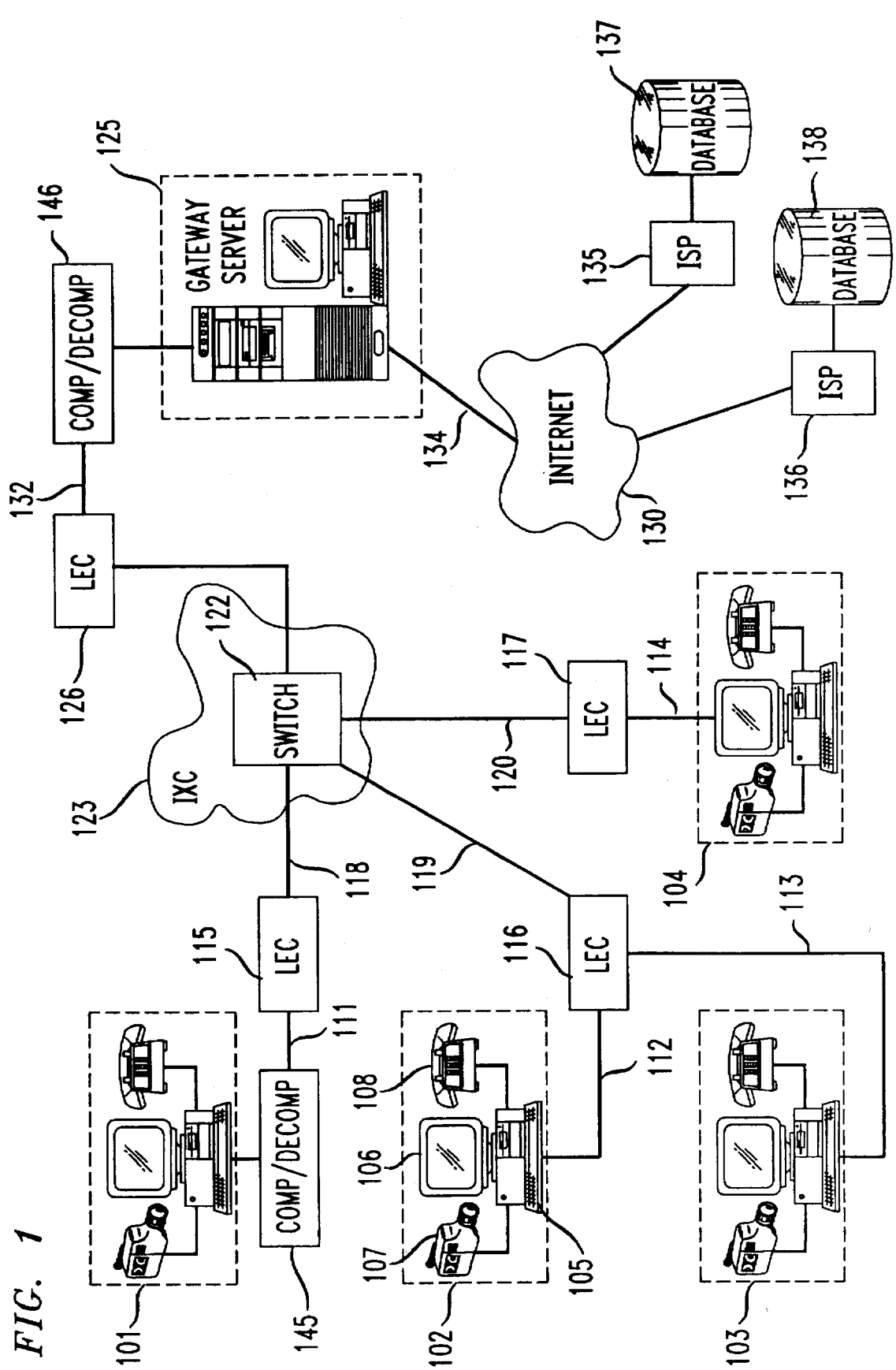
FIG. 1 is a block diagram of a simplified telecommunications network in accordance with an embodiment of the present invention.

With reference to FIG. 1, a simplified telecommunications network in accordance with the present invention is shown. It should be recognized that the network of FIG. 1 includes other elements, which have been eliminated in order to simplify the figure and in that they are not necessary for an understanding of the present invention disclosed herein.

The network shown includes plural multimedia terminals 101, 102, 103 and 104. Of course, an actual network would include many more such terminals, which can communicate with each other in a multimedia fashion over separate audio, video and data streams. Each multimedia terminal may include a Vistium PV product available from AT&T, which is compliant with the H.320 protocol, or may be another H.320 compliant terminal available from any other source such as Intel's ProShare terminal. As shown illustratively for terminal 102, each terminal generally includes a processing unit 105, a CRT 106 and a camera 107. A multimedia terminal 102 may also include an associated telephone 103 located external to the processing unit 105 for purposes of dialing another terminal's telephone number when the processing unit 105 is incapable of doing so directly. The processing unit 105 may be a general purpose computer with multimedia capable equipment incorporated therein, such as the Vistium board set which allows a conventional PC to perform video and ISDN communications that are compliant with the H.320 protocol. Alternatively, the processing unit may be a multimedia specific device.

The H.320 compliant multimedia terminals 101, 102, 103, and 104 are designed to communicate over ISDN or switched 56 kbps facilities. Thus each communications link 111, 112, 113, and 114 which connects terminals 101, 102, 103, and 104, respectively, to the Public Switched Telephone Network may be an ISDN Basic Rate Interface (BRI) phone line or switched 56 kbps line(s). As related to the communications link over which an H.320 multimedia terminal communicates, the ISDN BRI phone line and the switched 56 kbps line(s) will be referred to herein in the alternative as the "bearer channel". If the bearer channel is an ISDN BRI line, the channel consists of the conventional ISDN 2B+D channels in which the two B channels (where a B channel has a bandwidth of 64 kbps) are used for providing separate data, voice and video streams. In a preferred implementation, the video stream is at 64 kbps, the audio stream is at 16 kbps, and the data stream is at 32 kbps. If the bearer channel is a switched 56 kbps facility, the preferred embodiment would incorporate two 56 kbps lines, with the video, audio and video streams being divided into the three streams as defined above for the ISDN line. The H.320 terminal is also capable of operating over a single 56 kbps switched line in which for maximum data transmission capability, the video and voice streams can be minimized. Furthermore, in setting up a multimedia call over ISDN or switched 56 kbps facilities, the allocation of bandwidth can be allocated to the audio, video and data streams in a flexible manner.

Links 111, 112, 113, and 114 are connected to switches within the Local Exchange Carriers (LECs) associated with each terminal. As shown in FIG. 1, terminal 101 is connected to LEC 115, both terminals 102 and 103 are connected to a common LEC 116, and terminal 104 is connected to LEC 117. Each LEC may include a 5ESS® switch manufactured by AT&T Corp., or other switch. LECs 115, 116 and 117 are connected to a switch 122 within the Interexchange Carrier (IXC) switched network 123 by means of paths 118, 119 and 120, respectively, that may be ISDN Primary Rate Interface (PRI) lines consisting of 23B+D channels, T1 lines, switched 56 kbps lines, Asynchronous Transfer Mode (ATM) packet medium, or other digital transmission facilities. Switch 122 may be a 4ESS™ switch manufactured by AT&T Corp. In normal multimedia communications any of the H.320 compliant terminals 101, 102, 103 and 104, can communicate with each other, exchanging video, voice and data over the separate video, voice and data streams defined by the H.320 standard.

In accordance with the present invention, the H.320 terminals 101, 102, 103 and 104, in addition to having the ability to communicate with each other, are provided with the additional capability of accessing the Internet 130 over their data stream by dialing, either through their associated telephone set or through their processor, a gateway server 125 that is connected to the Internet 130. This gateway server 125, as shown in FIG. 1, is connected through its associated LEC 126 to switch 122 within the IXC network 123. Alternatively, however, server 125 may be directly associated with switch 122, being co-located with the switch 122 or located apart from the switch 122, but connected directly thereto, bypassing the LEC 126. As shown, the path 131 between switch 122 and LEC 126 and the path 132 between LEC 126 and gateway server 125 may be PRI ISDN, switched 56 kbps, T1, ATM packet transport medium, or other digital facilities. Gateway server 125, over path 132 or multiple other parallel paths, is capable of simultaneously serving a plurality of H.320 terminals. An accessing user is connected through gateway server 125 onto the Internet 130 over path 134, which in the preferred embodiment would be a LAN Ethernet connection. The Internet is connected to a plurality of Information Service Providers (ISPs), shown illustratively as 135 and 136, which provide information and/or services to accessing users. As can be noted, ISPs 135 and 136 have associated databases 137 and 138, respectively, which store information and/or data which may be accessed by a user.

In order for a H.320 terminal to access the Internet over the data stream of its bearer channel, a user's request, or "function call", or data to be transmitted to a remote machine or ISP, must be converted into the standardized TCP/IP format used over the Internet. Similarly, data from a remote machine or ISP must be converted from the TCP/IP format into a format usable by the H.320 terminal. In accordance with the present invention, an H.320 terminal and the gateway server 125 can function together either in accordance with either a proxy TCP/IP methodology or a direct TCP/IP methodology, described below.

In the proxy methodology the gateway server 125 acts as a proxy for Winsock calls made from the H.320 terminal accessing the Internet. Whenever an application program (such as Mosaic, Netscape, or any other Internet applications program) resident on any of the H.320 terminals 101–104 makes a function call to the Winsock DLL, the request contains the name of the function and any parameters passed in the function call. The gateway server 125 receives the request from the H.320 data stream and makes the corresponding function call. Since the gateway server 125 is connected to LAN 134, it uses a standard Winsock DLL to convert the call to TCP/IP format. When the standard Winsock call is completed and a response returned from the ISP to which the call is directed, the gateway server 125 sends a response back to the originating H.320 terminal 203 on the data stream of the bearer channel. This response may have status information or data and when returned to the originating terminal 203, completes the user's function call.

Figure 2:
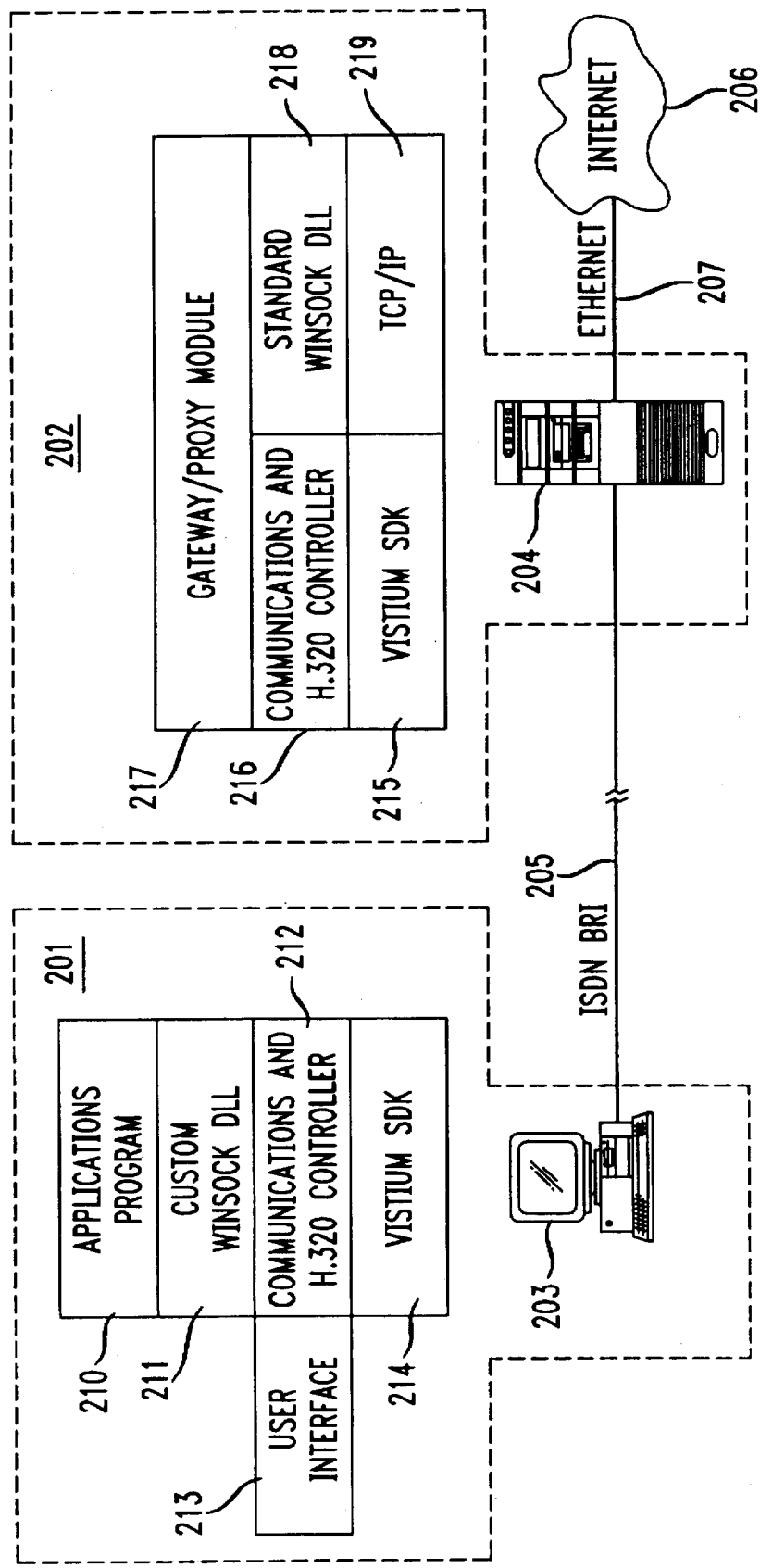
FIG. 2 shows the software protocol stacks associated with both the H.320 user terminal and the gateway server necessary to effect the proxy TCP/IP methodology of the present invention.

FIG. 2 shows the software protocol stacks 201 and 202 associated with an H.320 terminal 203 and a gateway server 204, respectively for the proxy methodology. As shown, terminal 203 and server 204 are connected to each other via ISDN facilities 205 and server 204 is connected to the Internet 206 by means of a LAN Ethernet 207. As previously described, however, the H.320 protocol can also be supported over switched 56 kbps facilities.

The Applications Program module 210 in software protocol stack 201 is a standard program such as Mosaic or Netscape, which function is to retrieve information from the Internet and display it to the user and to accept requests in the form of function calls from the user and pass them onto the Internet 206. The Custom Winsock DLL module 211 provides a standard interface between the Applications Program module 210 and the data transport medium 205, which in this invention is the data stream of the H.320 bearer channel. In addition to sending information over the H.320 data stream, the Custom Winsock DLL module 211 performs the additional step of packaging requests in the form of function calls and any parameters passed in the function call from the Applications Program into a format for transmission over the H.320 data stream to the gateway server 204. In addition to managing all information distribution to and from the Applications Program module 210, Custom Winsock DLL module 211 attaches an identifier to each information request that can be associated with the requesting application. A Communications and H.320 Controller module 212 functions to pass these packaged requests onto the H.320 data stream of the bearer channel. Module 212 functions without regard to the fact that a packaged Winsock request may be incorporated within such data. Module 212 further functions to control the connection between terminal 203 and server 204, ensuring that the ISDN or 56 kbps phone line connection is maintained. The User Interface module 213 performs the function of establishing the connection by dialing the number associated with gateway server 204 when the user of H.320 terminal 203 places a call to the gateway server to access the Internet. Module 213 also functions to monitor for signals from the phone, from the switch, and from gateway server 204, and to disconnect the connection when the user of terminal 203 disconnects the call. All such signals are acted upon independently of the Applications Program module 210 and the custom Winsock DLL module 211. If terminal 203 is a Vistium terminal, then a Vistium Software Development Kit (SDK) module 214, a software product available and sold by AT&T Corp. in connection with its Vistium PV product, provides the lowest level functionality for placing the packaged requests onto the H.320 data stream of bearer channel 205. If the H.320 terminal is other than an AT&T manufactured Vistium product, then an SDK associated with such other manufacturer's H.320 terminal will provide this functionality.

At gateway server 204, within software protocol stack 202, a Vistium SDK module 215 recognizes the data received on the H.320 data stream of bearer channel 205 and notifies Communications and H.320 Controller module 216 that data has been received. Module 216 accepts this data and passes it along to the Gateway/Proxy module 217. Gateway/Proxy module 217 unpackages this passed-along information, which is a Winsock function call and the parameters associated with the function call, and makes a corresponding standard "real" Winsock function call (i.e. executes a request) to its standard Winsock DLL module 218. TCP/IP module 219 formats this Winsock call for output to a LAN adapter card (not shown), which outputs the formatted function call (the executed request) over Ethernet connection 207 onto the Internet 206.

Status information or data retrieved from the Interact in response to the function call is received by TCP/IP module 219 in gateway server 204, which alerts the standard Winsock DLL module 218, which removes the TCP/IP formatting and passes the information to the Gateway/Proxy module 217. The Gateway/Proxy module 217 packages the information into a format recognizable by terminal 203 and passes the packaged information to the Communications and H.320 Controller 216. The information is then passed down to the Vistium SDK module 215 and transmitted on the H.320 data channel of the bearer channel 205 to terminal 203. At terminal 203, the Communications and H.320 Controller module 212 converts this information into a form that can be recognized by the Applications Program module 210 and then returns that information to the Applications Program for display or storage at terminal 203.

In this embodiment of the present invention, the Custom Winsock DLL module 211 that performs the aforedescribed packaging and unpackaging functions, is readily implemented by one skilled in the art. Similarly, the User Interface module 213 and the Communications and H.320 Controller module 212 in software protocol stack 201 at terminal 203, and the Gateway/Proxy Module 217 and Communications and H.320 Controller module 216 in software protocol stack 202 at server 204 are also readily implemented by one skilled in the art.

Figure 3:
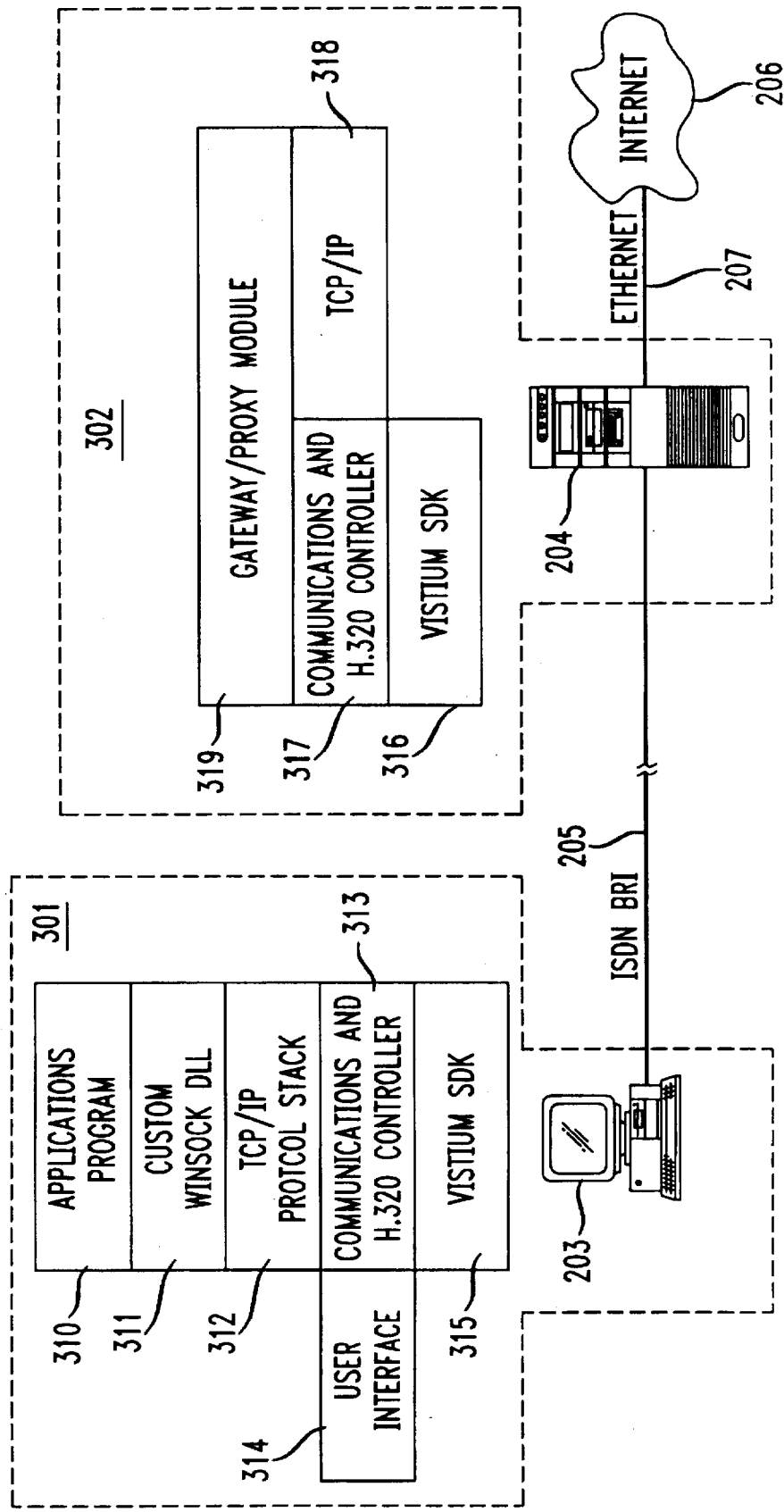
FIG. 3 shows the software protocol stacks associated with both the H.320 user terminal and the gateway server necessary to effect the direct TCP/IP methodology of the present invention.

FIG. 3 shows the software protocol stacks 301 and 302 associated with terminal 203 and gateway server 204, respectively, for the direct TCP/IP implementation of the present invention. Similar numerical designations given to the terminal, server, and associated network elements in this figure are the same as are used in FIG. 2. In this direct TCP/IP embodiment, as in the proxy TCP/IP embodiment described above, the Applications Program module 310 in software protocol stack 301 associated with terminal 203 makes a function call to a Custom Winsock module 311 (i.e. executes a request). Instead of packaging the Winsock request to be serviced by a proxy, however, Custom Winsock module 311 passes a executed the executed Winsock request to TCP/IP Protocol Stack module 312, which directly converts the request into the TCP/IP format and then passes that formatted request to the Communications and H.320 Controller module 313. As in the previous embodiment, module 313 passes that data to the Vistium SDK for transmission on the H.320 data stream of bearer channel 205. At gateway server 204, Vistium SDK module 316 receives that data and passes it on to the Communications and H.320 Controller module 317, which alerts the Gateway module 318. Gateway module 318 takes that data, already in TCP/IP format and sends it the lowest part of a TCP/IP stack 318 for output to a LAN adapter card connected to Ethernet 207 and then onto the Internet 206. Inasmuch as the executed request received by server 204 from terminal 203 is already in IP format, it should be noted that the software protocol stack 302 does not require a Winsock DLL.

In the opposite direction, data from the Internet is received by gateway server 204 in TCP/IP format. TCP/IP module 318 picks up the data as is it comes off the LAN adapter and passes the data, still in TCP/IP format to the Gateway module 319. Gateway module 319 passes this data to the Communications and H.320 Controller module 317, which sends it over the H.320 data stream of the bearer channel 205 for transmission to terminal 203. At terminal 203, the Vistium SDK module 315 receives the data and alerts the Communications and H.320 Controller 313 which passes the data to the TCP/IP Protocol Stack module 312. Module 312 interprets the data in TCP/IP format, unformats it, places in a format familiar to the applications programs, and passes it to Custom Winsock module 311. Module 311 then returns the data to the Applications Program module 310, from where it is stored or display to the user of terminal 203.

As in the previous embodiment, User Interface module 314 and Communications and H.320 Controller module 313 within terminal 203 are used to establish a call, and to monitor the phone line for signals from the phone, from the switch, and from the gateway server. The Communications and H.320 Controller module within server 204 perform a complimentary function. As in the previous embodiment, the custom software modules are readily implemented by one skilled in the art.

With reference again to FIG. 2, as previously noted the H.320 protocol supports a flexible allocation of bandwidth to the data, voice and video bit streams. Thus, in order to increase the throughput of the data retrieved from the Internet 130 by gateway server 125 and transferred over the data stream of the bearer channel to a requesting terminal, the bandwidth allocated to the data bit stream can be increased larger than its usual 32 kbps. Thus, by substantially reducing the bandwidths allocated to the audio and video streams, the bandwidth of the data bit stream can be increased to approach the entire bandwidth of the bearer channel. Throughput can also be increased by employing compression and decompression of the data stream. Thus, a compressor/decompressor 145 shown associated with terminal 101 and a compressor/decompressor 145 associated with gateway server 125 together serve to compress data to be transmitted over the H.320 data stream of the bearer channel from one end, and then decompress such compressed data at the other end of the bearer channel. The effective data transfer rate can thus be substantially increased over the nominal 32 kbps bandwidth of the H.320 data stream. Compressor/decompressor 146 can be switchably connected to line 132, for use only when a terminal using compression and decompression accesses gateway server 125.

The above-described embodiments are illustrative of the principles of the present invention. Other embodiments could be devised by those skilled in the art without departing from the spirit and scope of the present invention.

The invention claimed is:

1. In a telecommunications network, a method of providing access to the Internet to a multimedia terminal capable of communicating voice, video and data signals over separate voice, video and data streams, respectively, on a bearer channel in accordance with a standardized H.320 protocol, the method comprising the steps of:

establishing a data connection between the multimedia terminal and a gateway server that is remote from the terminal and is connected to the Internet, the data connection being at least in part over the bearer channel on only at least a portion of the data stream, for transmitting data associated with a request and a response to such request to and from a provider connected on the Internet, respectively, while the multimedia terminal simultaneously maintains the capability of transmitting and receiving the video and voice signals on the video and voice streams, respectively, on the bearer channel;

receiving, at the gateway server from the multimedia terminal over the data connection, the data associated with the request;

transmitting, by the gateway server, onto the Internet, an executed request initiated by the terminal to the provider in a format that is compatible for transmission on the Internet;

receiving, at the gateway server, from off the Internet from the provider, a response to the request; and;

forwarding, by the gateway server, the response to the request to the terminal over the data connection.

2. The method of claim 1 wherein the multimedia terminal executes the request and transmits the executed request to the gateway server in a format that is compatible for transmission on the Internet, the gateway server receiving the executed request from the multimedia terminal over the data connection and transmitting the executed request onto the Internet to the provider.

3. The method of claim 2 wherein the response to the request from the provider received by the gateway server from the Internet is directly forwarded, in an Internet-compatible format that it is received, to the multimedia terminal over the data connection.

4. The method of claim 2 wherein the executed request received by the gateway server from the multimedia terminal is received in a TCP/IP format.

5. The method of claim 1 further comprising the step of converting, at the gateway receiver, the received data associated with the request into the executed request for transmission on the Internet to the provider.

6. The method of claim 5 wherein prior to the step of forwarding the response to the request to the multimedia terminal the method further comprises the step of removing formatting used for the transmission of the response on the Internet.

7. The method of claim 5 wherein the format compatible for transmission on the Internet is a TCP/IP format.

8. The method of claim 5 wherein the request received by the gateway server from the multimedia terminal is a Winsock function call, and the method further comprises the step of making a function call to a Winsock dynamic link library stored within the gateway server in response to the received Winsock function call, which function call is formatted by the gateway server for transmission on the Internet in a TCP/IP format.

9. The method of claim 1 further comprising the step of compressing the response from the provider received by the gateway server before it is forwarded to the multimedia terminal over the data connection.

10. The method of claim 9 further comprising the step of decompressing a compressed request received by the gateway server from the multimedia terminal over the data connection.

11. The method of claim 1 when after the step of establishing the data connection, the method further comprises the step of adjusting the bandwidth of the data stream to be larger than the bandwidths of either the voice or video streams.

12. The method of claim 1 wherein the bearer channel is an ISDN phone line.

13. The method of claim 1 wherein the bearer channel is at least one 56 kbps switched line.

14. A gateway server for providing Internet access to a multimedia terminal capable of communicating voice, video and data signals over separate voice, video and data streams, respectively, on a bearer channel in accordance with a standardized H.320 protocol, the server comprising:

means for connecting to a data connection for connecting the gateway server to the multimedia terminal at least in part over the bearer channel on only a portion of the data stream, the data connection having transmitted thereon data associated with a request made by the multimedia terminal to a provider connected on the Internet and a response to such request from the provider to the multimedia terminal, while the multimedia terminal simultaneously maintains the capability of transmitting and receiving the video and voice signals on the video and voice streams, respectively, on the bearer channel.;

means for connecting to the Internet;

means for receiving from the multimedia terminal over the data connection the data associated with the request;

means for transmitting onto the Internet an executed request to the provider in a format that is compatible for transmission on the Internet;

means for receiving from the Internet from the provider a response to the request; and means for forwarding the response to the request to the multimedia terminal over the data connection.

15. The gateway server of claim 14 wherein the multimedia terminal executes the request and transmits the executed request to the gateway server in a format that is compatible for transmission on the Internet on the only at least a portion of the data stream of the bearer channel over the data connection, the means for transmitting onto the Internet transmitting the executed request to the provider.

16. The gateway server of claim 15 wherein the received response to the request from the provider is directly forwarded by said means for forwarding to the multimedia terminal over the data connection in the Internet-compatible format that it is received.

17. The gateway server of claim 15 wherein the executed request received from the multimedia terminal is received in a TCP/IP format.

18. The gateway server of claim 14 further comprising means for converting the received data associated with the request into the executed request for transmission over the Internet to the provider.

19. The gateway server of claim 18 wherein, before forwarding the response to the request to the multimedia terminal the formatting used for the transmission of the response on the Internet is removed.

20. The gateway server of claim 18 wherein the format compatible for transmission on the Internet is a TCP/IP format.

21. The gateway server of claim 18 wherein the request received from the multimedia terminal is a Winsock function call, and the gateway server further comprises a stored Winsock dynamic link library to which a function call is made in response to the received Winsock function call, which function call is formatted for transmission on the Internet to a TCP/IP format.

22. The gateway server of claim 14 further comprising means for compressing the received response from the provider before forwarding it to the multimedia terminal over the data connection.

23. The gateway server of claim 22 further comprising means for decompressing a compressed request received from the multimedia terminal over the data connection.

24. The gateway server of claim 14 wherein the bearer channel is an ISDN phone line.

25. The gateway server of claim 14 wherein the bearer channel is at least one 56 kbps switched line.

* * * * *